(12) United States Patent
Tam et al.

(10) Patent No.: US 11,715,866 B2
(45) Date of Patent: Aug. 1, 2023

(54) METHOD OF FORMING EDGE MATERIALS ON ELECTROCHEMICAL CELL COMPONENT

(71) Applicant: GM Global Technology Operations LLC, Detroit, MI (US)

(72) Inventors: Wai Ping Gloria Tam, Troy, MI (US); David F. Titmuss, Commerce Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 295 days.

(21) Appl. No.: 17/323,038

(22) Filed: May 18, 2021

(65) Prior Publication Data
US 2022/0376369 A1 Nov. 24, 2022

(51) Int. Cl.
| | |
|---|---|
| *H01M 50/59* | (2021.01) |
| *H01M 50/586* | (2021.01) |
| *B33Y 10/00* | (2015.01) |
| *B29C 64/112* | (2017.01) |
| *H01M 50/533* | (2021.01) |
| *B33Y 80/00* | (2015.01) |
| *H01M 4/04* | (2006.01) |
| *B29L 31/34* | (2006.01) |

(52) U.S. Cl.
CPC ........... *H01M 50/59* (2021.01); *B29C 64/112* (2017.08); *B33Y 10/00* (2014.12); *B33Y 80/00* (2014.12); *H01M 4/0404* (2013.01); *H01M 50/533* (2021.01); *H01M 50/586* (2021.01); *B29L 2031/3468* (2013.01)

(58) Field of Classification Search
CPC .................................................. H01M 4/0404
See application file for complete search history.

(56) References Cited

U.S. PATENT DOCUMENTS

| | | | |
|---|---|---|---|
| 2016/0036009 A1* | 2/2016 | Cho ..................... | B23K 26/244 |
| | | | 219/121.72 |
| 2022/0246908 A1* | 8/2022 | Tsukamoto ........... | H01M 4/139 |

FOREIGN PATENT DOCUMENTS

| | | | |
|---|---|---|---|
| CN | 110383410 | * | 10/2019 |
| WO | WO 2021/238537 | * | 12/2021 |

* cited by examiner

*Primary Examiner* — Jonathan Crepeau
(74) *Attorney, Agent, or Firm* — Vivacqua Crane, PLLC

(57) ABSTRACT

A method of forming edge materials on an electrochemical cell component having a metallic foil substrate including a conductive coating on top and bottom surfaces and first and second edge portions extending laterally outward beyond the conductive coating, includes pulling the metallic foil substrate from a roll, feeding the metallic foil substrate through a profile machine and forming notches within the first and second edge portions that extend inwardly from outermost edges of the first and second edge portions a distance less than a distance between the outermost edges and the conductive coating, and define a plurality of electrode tabs, feeding the strip of metallic foil substrate sequentially through a plurality of 3-dimensional printing machines and printing edge materials onto the electrode tabs and the first and second edge portions between the plurality of electrode tabs, and rolling the strip of metallic foil substrate onto a roll.

20 Claims, 3 Drawing Sheets

METHOD OF FORMING EDGE MATERIALS ON ELECTROCHEMICAL CELL COMPONENT

INTRODUCTION

The present disclosure relates to applying a coating of edge materials to electrode tabs of an electrochemical cell component.

Electrochemical cells are generally made up of layers of cells. Generally, an electrochemical cell component comprises a thin layer of a conductive metallic foil substrate, such as copper or aluminum. A conductive coating is placed onto a top and bottom surface of the metallic foil substrate. Edge portions of the metallic foil substrate extending laterally outward beyond the conductive coating. Electrode tabs are formed within the edge portions of the metallic foil substrate.

In certain occasions, edge materials may be placed onto the edge portion of the metallic foil substrate before the tabs are formed therein to either prevent short circuit between electrode tabs of adjacent layers or components of an electrochemical cell or to strengthen the electrode tabs for further downstream processes. When this is done, the entire surface of the edge portions is coated, leading to wasted edge materials.

Thus, while current methods of forming electrochemical cell components achieve their intended purpose, there is a need for a new and improved method of forming edge materials onto an electrochemical cell component that reduces wasted edge materials.

SUMMARY

According to several aspects of the present disclosure, a method of forming edge materials on an electrochemical cell component having a strip of metallic foil substrate includes pulling the strip of metallic foil substrate from a roll, feeding the strip of metallic foil substrate through a profile machine and forming a plurality of electrode tabs within a first edge portion of the metallic foil substrate and within a second edge of the metallic foil substrate, printing, via a 3-dimensional printing process, a layer of edge materials onto the plurality of electrode tabs, and rolling the strip of metallic foil substrate onto a roll.

According to another aspect, printing, via a 3-dimensional printing process, a layer of edge materials onto the plurality of electrode tabs further includes feeding the strip of metallic foil substrate through a first 3-dimensional printing machine and printing a first layer of edge materials onto the plurality of electrode tabs.

According to another aspect, printing, via a 3-dimensional printing process, a layer of edge materials onto the plurality of electrode tabs further includes feeding the strip of metallic foil substrate through a second 3-dimensional printing machine and printing a second layer of edge materials onto the plurality of electrode tabs after feeding the strip of metallic foil substrate through a first 3-dimensional printing machine and printing a first layer of edge materials onto the plurality of electrode tabs.

According to another aspect, printing, via a 3-dimensional printing process, a layer of edge materials onto the plurality of electrode tabs further includes feeding the strip of metallic foil substrate sequentially through a plurality of 3-dimensional printing machines and printing a plurality of layers of edge materials onto the plurality of electrode tabs.

According to another aspect, printing, via a 3-dimensional printing process, a layer of edge materials onto the plurality of electrode tabs further includes printing, via an ink-jet printing process, a layer of edge materials onto the plurality of electrode tabs.

According to still another aspect, the method further includes feeding the strip of metallic foil substrate through a curing station, and curing the layer of edge materials, after printing, via a 3-dimensional printing process, the layer of edge materials onto the plurality of electrode tabs.

According to yet another aspect, the metallic foil substrate includes a conductive coating on a top surface and a bottom surface, the first and second edge portions of the metallic foil substrate extending laterally outward beyond the conductive coating, and feeding the strip of metallic foil substrate through a profile machine and forming a plurality of electrode tabs within the first edge portion of the metallic foil substrate and within the second edge portion of the metallic foil substrate further includes forming notches within the first and second edge portions of the metallic foil substrate that extend inwardly from outermost edges of the first and second edge portions of the metallic foil substrate a distance less than a distance between the outermost edges of the first and second edge portions and the conductive coating.

According to another aspect, printing, via a 3-dimensional printing process, the layer of edge materials onto the plurality of electrode tabs further includes simultaneously printing, via a 3-dimensional printing process, a layer of edge materials on the first and second edge portions between the plurality of electrode tabs.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
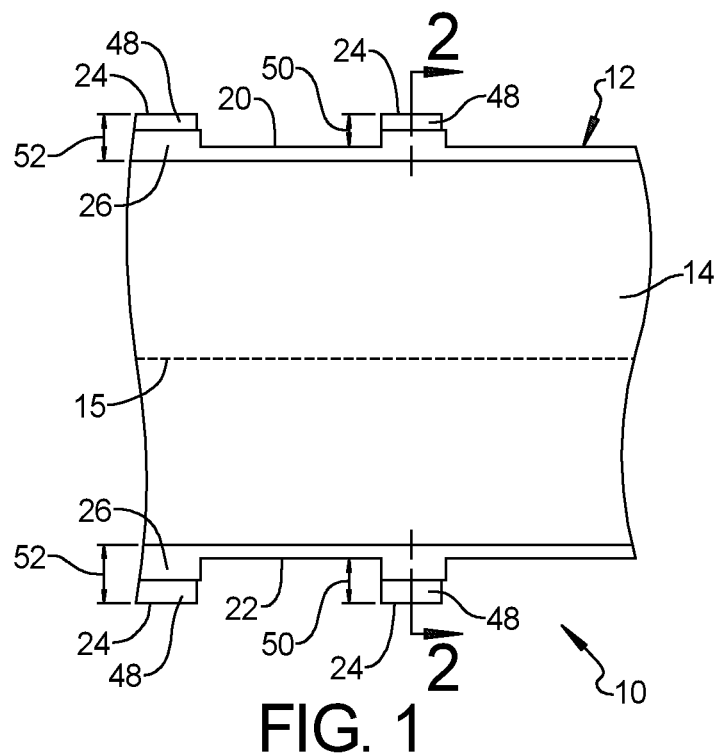
FIG. 1 is a top view of a strip of electrochemical cell component material in accordance with an exemplary embodiment of the present disclosure.
Figure 2:
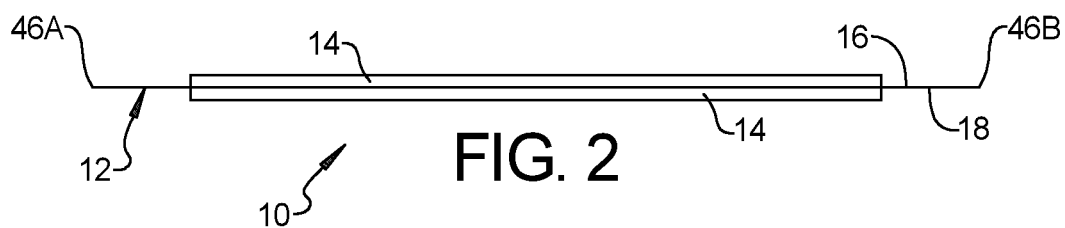
FIG. 2 is a cross sectional view taken along line 2-2 of FIG. 1.

Referring to FIG. 1 and FIG. 2, an electrochemical cell component 10 includes a metallic foil substrate 12 and a layer of a conductive coating 14 on a top surface 16 and a bottom surface 18 of the metallic foil substrate 12. First and second edge portions 20, 22 of the metallic foil substrate 12 extending laterally outward beyond the conductive coating 14. Electrode tabs 24 are formed within the first and second edge portions 20, 22 of the metallic foil substrate 12. Edge materials 26 are applied to the electrode tabs 24 and to the first and second edge portions 20, 22 between the electrode tabs 24. The electrochemical cell component 10 may be an anode, a cathode or a separator for an electrochemical cell. FIG. 1 is a break out view of a strip from which an electrochemical cell component 10 would be cut from. The strip further includes a perforation 15, wherein two electrochemical cell components 10 are simultaneously formed side by side from the strip. The edge materials 26 may be adapted to provide additional strength to the electrochemical cell component 10 or to provide insulation of the electrode tabs 24 to prevent shorting across adjacent electrochemical cell components 10 within an electrochemical cell. It should be understood that the edge materials 26 may comprise any suitable material that provides advantageous characteristics for the electrochemical cell.

Figure 3:
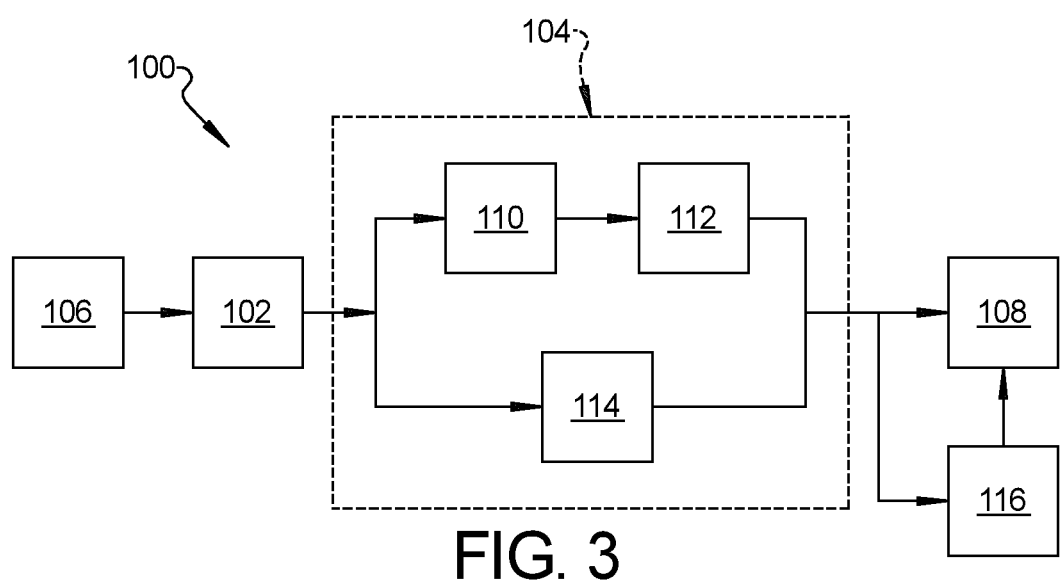
FIG. 3 is a flow chart illustrating a method of forming edge materials on a roll of electrochemical cell component material.

Referring to FIG. 3, a flowchart illustrating a method 100 of forming edge materials 26 on an electrochemical cell component 10 is shown. Starting at block 102, the method includes forming a plurality of electrode tabs 24 within the first edge portion 20 of the metallic foil substrate 12 and within the second edge portion 22 of the metallic foil substrate 12. Moving on to block 104, the method 100 further includes applying edge materials 26 on the plurality of electrode tabs 24.

Figure 4:
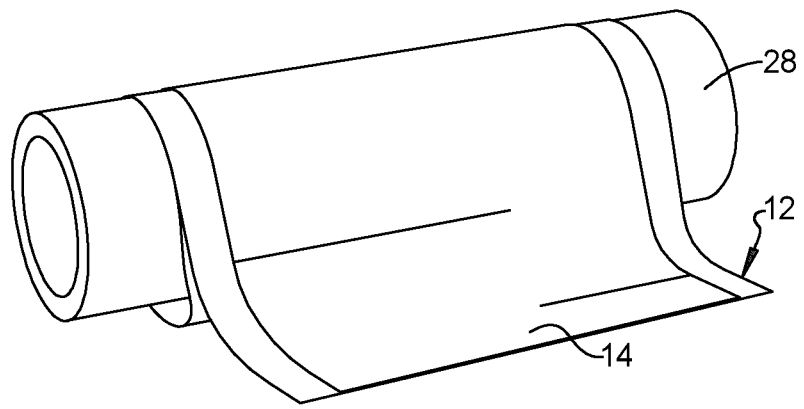
FIG. 4 is a perspective view of a roll of electrochemical cell component material.

Referring to FIG. 4, the metallic foil substrate 12 of the electrochemical cell component 10 starts out on a roll 28. Referring again to FIG. 3, and moving to block 106, in an exemplary embodiment, the method 100 includes pulling the strip of metallic foil substrate 12 from a roll 28 prior to forming the plurality of electrode tabs 24 within the first edge portion 20 of the metallic foil substrate 12 and within the second edge portion 22 of the metallic foil substrate 12. Moving to block 108, after applying edge materials 26 on the plurality of electrode tabs 24, the method 100 includes rolling the strip of metallic foil substrate 12 back onto a roll 28.

Figure 5:
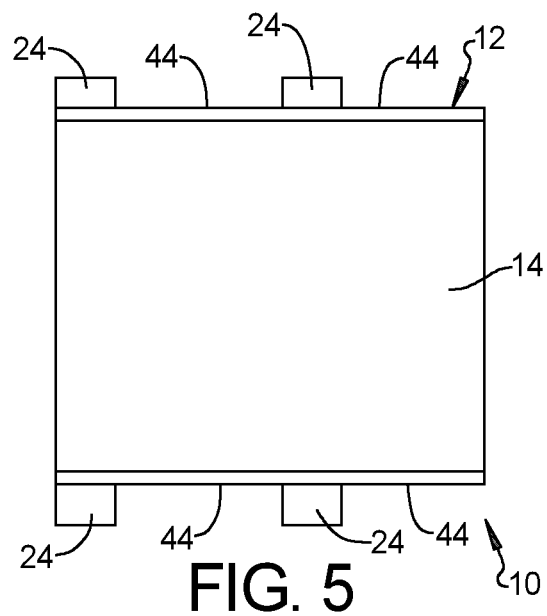
FIG. 5 is a top view of a portion of a roll of electrochemical cell component material before notches are formed and before edge materials are applied.

In an exemplary embodiment, forming a plurality of electrode tabs 24 within the first edge portion 20 of the metallic foil substrate 12 and within the second edge portion 22 of the metallic foil substrate 12 at block 102 further includes feeding the strip of metallic foil substrate 12 through a profile machine 30. Referring to FIG. 5, the profile machine 30 removes portions of the first and second edge portions 20, 22 of the metallic foil substrate 12 to define the electrode tabs 24. The profile machine 30 may use any suitable known methods to remove material from the first and second edge portions 20, 22, such as, by way of non-limiting examples, by stamping, cutting, laser cutting, die cutting, or any other suitable method.

Figure 6:
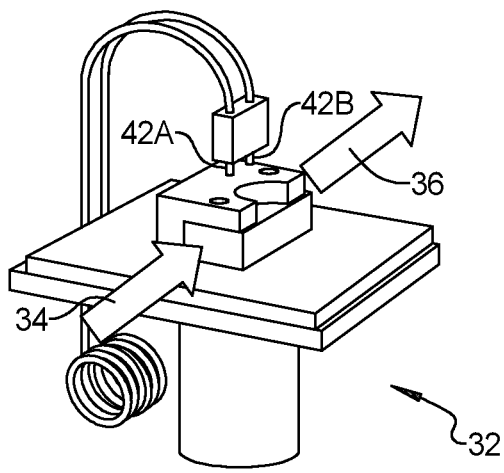
FIG. 6 is a perspective view illustrating a roll of electrochemical cell component material being fed through a 3D printer as edge materials are applied.

Referring to FIG. 6, in an exemplary embodiment, applying the edge materials 26 on the plurality of electrode tabs 24 at block 104 further includes printing, via a 3-dimensional printing process, the layer of edge materials 26 onto the plurality of electrode tabs 24. The strip of metallic foil substrate 12 is fed into a 3-dimensional printing machine 32, as shown by arrow 34. The 3-dimensional printing machine 32 places a layer of edge materials 26 onto the electrode tabs 24, and the strip of metallic foil substrate 12 leaves the 3-dimensional printing machine 32, as shown by arrow 36.

Referring to FIG. 3, and moving to block 110, in an exemplary embodiment, printing, via a 3-dimensional printing process, the layer of edge materials 26 onto the plurality of electrode tabs 24 further includes feeding the strip of metallic foil substrate 12 through a first 3-dimensional printing machine 32A and printing a first layer 38A of edge materials onto the plurality of electrode tabs 24, and moving to block 112, feeding the strip of metallic foil substrate 12 through a second 3-dimensional printing machine 32B and printing a second layer 38B of edge materials 26 onto the plurality of electrode tabs 24 after feeding the strip of metallic foil substrate 12 through the first 3-dimensional printing machine 32A and printing the first layer 38A of edge materials 26 onto the plurality of electrode tabs 24.

Figure 7A:
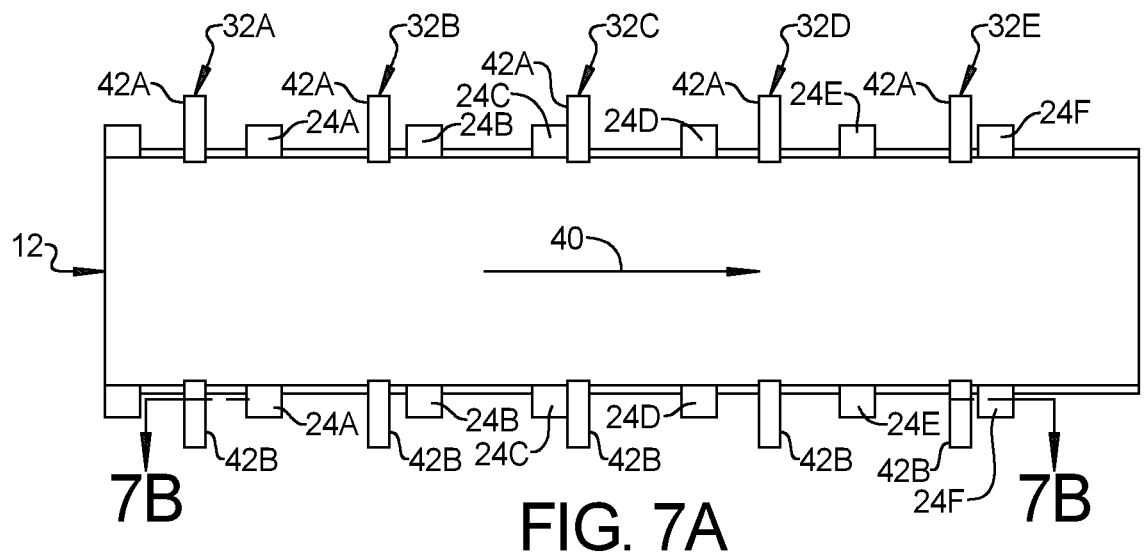
FIG. 7A is a top view of a portion of a roll of electrochemical cell component material being fed through a plurality of 3d printing machines.

In still another exemplary embodiment, moving to block 114 of FIG. 3, printing, via a 3-dimensional printing process, the layer of edge materials 26 onto the plurality of electrode tabs 24 further includes feeding the strip of metallic foil substrate 12 sequentially through a plurality of 3-dimensional printing machines 32A, 32B, 32C, 32D, 32E and printing a plurality of layers 38A, 38B, 38C, 38D, 38E of edge materials 26 onto the plurality of electrode tabs 24. Referring to FIG. 7A, a schematic top view is shown wherein a strip of metallic foil substrate 12 is fed, as indicated by arrow 40, through a plurality of 3-dimensional printing machines 32A, 32B, 32C, 32D, 32E. As shown, the strip of metallic foil substrate 12 is fed sequentially through five individual 3-dimensional printing machines 32A, 32B, 32C, 32D, 32E. Each of the five 3-dimensional printing machines 32A, 32B, 32C, 32D, 32E have first and second print heads 42A, 42B adapted to apply edge materials 26 onto the electrode tabs 24.

Figure 7B:
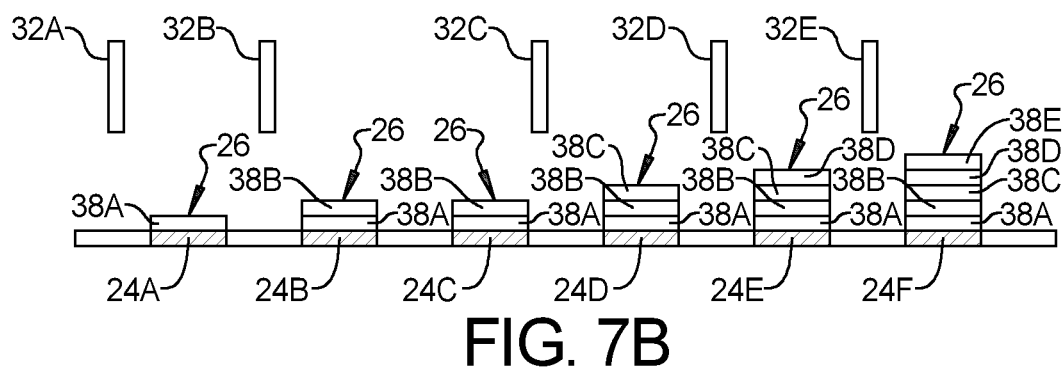
FIG. 7B is schematic side sectional view taken along line 7B-7B of FIG. 7A.

Referring to FIG. 7B, by using multiple 3-dimensional printing machines 32A, 32B, 32C, 32D, 32E, in series, the edge materials 26 may be placed onto the electrode tabs 24 in multiple layers 38A, 38B, 38C, 38D, 38E to achieve a specified thickness in minimal time. As the strip of metallic foil substrate 12 moves through the plurality of 3-dimensional printing machines 32A, 32B, 32C, 32D, 32E, a first pair of electrode tabs 24A has passed through a first one 32A of the plurality of 3-dimensional printing machines 32A, 32B, 32C, 32D, 32E, and correspondingly has a single layer 38A of edge materials 26 printed thereon. Second and third pairs 24B, 24C of electrode tabs 24 have passed through the first 32A and a second one 32B of the plurality of 3-dimensional printing machines 32A, 32B, 32C, 32D, 32E, and correspondingly have two layers 38A, 38B of edge materials 26 printed thereon. A fourth pair 24D of electrode tabs 24 have passed through the first 32A, second 32B and a third one 32C of the plurality of 3-dimensional printing machines 32A, 32B, 32C, 32D, 32E, and correspondingly have three layers 38A, 38B, 38C of edge materials 26 printed thereon. A fifth pair 24E of electrode tabs 24 have four layers 38A, 38B, 38C, 38D of edge materials 26 printed thereon, and a sixth pair 24F of electrode tabs 24 have five layers 38A, 38B, 38C, 38D, 38E of edge materials 26 printed thereon. The layers 38A, 38B, 38C, 38D, 38E of edge materials 26 are shown having an exaggerated thickness for illustrative purposes.

The 3-dimensional printing process may be any known process suitable for printing a layer of edge materials 26 onto the electrode tabs 24. In an exemplary embodiment, the layers 38A, 38B, 38C, 38D, 38E of edge materials 26 are printed onto the electrode tabs 24 by an ink-jet printing process. On advantage of using a 3-dimensional printing machine 32 to apply the edge materials 26 is that the edge materials 26 may be applied in patterns that are suitable for a particular application. For example, the edge materials 26 may be applied in a solid layer, as shown in the Figures. Alternatively, the edge materials 26 may be applied in stripes, a checkerboard pattern, or a matrix of dots or squares. The 3-dimensional printing process provides the flexibility to apply the edge materials 26 in any pattern.

In another exemplary embodiment, referring again to FIG. 3 and moving to block 116, the method includes feeding the strip of metallic foil substrate 12 through a curing station, and curing the edge materials 26 onto the plurality of electrode tabs 24. Some materials that may be suitable for use as an edge materials 26 on the electrode tabs 24 must be cured to harden or adhere to the electrode tabs 24. Curing may be done by heating the edge materials 26 after application or exposing the edge materials 26 to ultraviolet light.

Referring again to FIG. 1, in an exemplary embodiment, the profile machine 30 forms notches 44 within the first and second edge portions 20, 22 of the metallic foil substrate 12 that extend inwardly from outermost edges 46A, 46B of the first and second edge portions 20, 22 of the metallic foil substrate 12 a distance 50 that is less than a distance 52 between the outermost edges 46A, 46B of the first and second edge portions 20, 22 and the conductive coating 14. This leaves exposed sections of the first and second edge portions 20, 22 between the electrode tabs 24. When the edge materials 26 is printed onto the electrode tabs 24, the insulation coating 26 is simultaneously printed onto the first and second edge portions 20, 22 between the plurality of electrode tabs 24.

Referring again to FIG. 1, in an exemplary embodiment, the edge materials does not extend out to the outermost edges 46A, 46B of the first and second edge portions 20, 22, leaving distal ends 48 of the electrode tabs 24 exposed.

Figure 8:
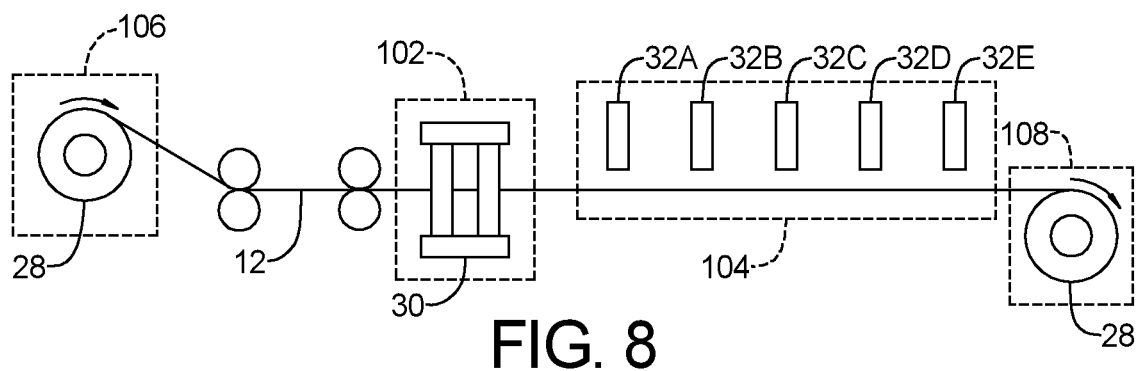
FIG. 8 is a schematic view illustrating a method of forming edge materials on a strip of electrochemical cell component material according to an exemplary embodiment.

Referring again to FIG. 3 and to FIG. 8, the method is illustrated, beginning at block 106, the method includes pulling the strip of metallic foil substrate 12 from a roll 28, moving to block 102, feeding the strip of metallic foil substrate 12 through a profile machine 30. The profile machine 30 forming notches 44 within the first and second edge portions 20, 22 of the metallic foil substrate 12. Then, moving to block 114, feeding the strip of metallic foil substrate 12 sequentially through a plurality of 3-dimensional printing machines 32A, 32B, 32C, 32D, 32E and printing a plurality of layers 38A, 38B, 38C, 38D, 38E of edge materials 26 onto the plurality of electrode tabs 24 and the first and second edge portions 20, 22 between the plurality of electrode tabs 24. Finally, moving to block 108, rolling the strip of metallic foil substrate 12 back onto a roll 28.

A method of the present disclosure offers several advantages. These include applying 3-dimensional printing of edge materials 26 on a continuous roll to roll operation wherein the print heads 42A, 42B of 3-dimensional printing machines 32 can be programmed to target the 3-dimensional printing for the appropriate pattern to minimize edge materials usage and waste. A plurality 3-dimensional printing machines 32A, 32B, 32C, 32D, 32E, in series, achieves rapid line speed and target thickness of the edge materials 26. This method also allows application of edge materials 26 in the proper locations where they are needed and can be custom designed layer by layer to achieve specific performance characteristics. The current method produces a cleaner waste stream at the notching operation, as the removed material from the first and second edge portions 20, 22 does not yet include edge materials 26, and lowers overall cost by reducing the amount of wasted edge materials 26.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of forming edge materials on an electrochemical cell component having a strip of metallic foil substrate, comprising:
    forming a plurality of electrode tabs within a first edge portion of the metallic foil substrate and within a second edge portion of the metallic foil substrate; and
    printing, via a 3-dimensional printing process, a layer of edge materials on the plurality of electrode tabs.

2. The method of claim 1, wherein forming a plurality of electrode tabs within the first edge portion of the metallic foil substrate and within the second edge portion of the metallic foil substrate further includes feeding the strip of metallic foil substrate through a profile machine.

3. The method of claim 2, wherein printing, via a 3-dimensional printing process, the layer of edge materials onto the plurality of electrode tabs further includes feeding the strip of metallic foil substrate through a first 3-dimensional printing machine and printing a first layer of edge materials onto the plurality of electrode tabs.

4. The method of claim 3, wherein printing, via a 3-dimensional printing process, the layer of edge materials onto the plurality of electrode tabs further includes feeding the strip of metallic foil substrate through a second 3-dimensional printing machine and printing a second layer of edge materials onto the plurality of electrode tabs after feeding the strip of metallic foil substrate through the first 3-dimensional printing machine and printing the first layer of edge materials onto the plurality of electrode tabs.

5. The method of claim 2, wherein printing, via a 3-dimensional printing process, the layer of edge materials onto the plurality of electrode tabs further includes feeding the strip of metallic foil substrate sequentially through a plurality of 3-dimensional printing machines and printing a plurality of layers of edge materials onto the plurality of electrode tabs.

6. The method of claim 2, further including:
    pulling the strip of metallic foil substrate from a roll prior to forming the plurality of electrode tabs within the first edge portion of the metallic foil substrate and within the second edge portion of the metallic foil substrate; and
    rolling the strip of metallic foil substrate onto a roll after printing, via a 3-dimensional printing process, the layer of edge materials onto the plurality of electrode tabs.

7. The method of claim 6, wherein printing, via a 3-dimensional printing process, the layer of edge materials onto the plurality of electrode tabs further includes printing, via an ink-jet printing process, the layer of edge materials onto the plurality of electrode tabs.

8. The method of claim 6, further including:
    feeding the strip of metallic foil substrate through a curing station; and
    curing the layer of edge materials, after printing, via a 3-dimensional printing process, the layer of edge materials onto the plurality of electrode tabs.

9. The method of claim 6, wherein the metallic foil substrate includes a conductive coating on a top surface and a bottom surface, the first and second edge portions of the metallic foil substrate extending laterally outward beyond the conductive coating;
wherein, feeding the strip of metallic foil substrate through a profile machine and forming a plurality of electrode tabs within the first edge portion of the metallic foil substrate and within the second edge portion of the metallic foil substrate further includes forming notches within the first and second edge portions of the metallic foil substrate that extend inwardly from outermost edges of the first and second edge portions of the metallic foil substrate a distance less than a distance between the outermost edges of the first and second edge portions and the conductive coating.

10. The method of claim 9, wherein printing, via a 3-dimensional printing process, the layer of edge materials onto the plurality of electrode tabs further includes simultaneously printing, via a 3-dimensional printing process, a layer of edge materials on the first and second edge portions between the plurality of electrode tabs.

11. A method of forming edge materials on an electrochemical cell component having a strip of metallic foil substrate, comprising:
pulling the strip of metallic foil substrate from a roll;
feeding the strip of metallic foil substrate through a profile machine and forming a plurality of electrode tabs within a first edge portion of the metallic foil substrate and within a second edge portion of the metallic foil substrate;
printing, via a 3-dimensional printing process, a layer of edge materials onto the plurality of electrode tabs; and
rolling the strip of metallic foil substrate onto a roll.

12. The method of claim 11, wherein printing, via a 3-dimensional printing process, a layer of edge materials onto the plurality of electrode tabs further includes feeding the strip of metallic foil substrate through a first 3-dimensional printing machine and printing a first layer of edge materials onto the plurality of electrode tabs.

13. The method of claim 12, wherein printing, via a 3-dimensional printing process, a layer of edge materials onto the plurality of electrode tabs further includes feeding the strip of metallic foil substrate through a second 3-dimensional printing machine and printing a second layer of edge materials onto the plurality of electrode tabs after feeding the strip of metallic foil substrate through a first 3-dimensional printing machine and printing a first layer of edge materials onto the plurality of electrode tabs.

14. The method of claim 11, wherein printing, via a 3-dimensional printing process, a layer of edge materials onto the plurality of electrode tabs further includes feeding the strip of metallic foil substrate sequentially through a plurality of 3-dimensional printing machines and printing a plurality of layers of edge materials onto the plurality of electrode tabs.

15. The method of claim 11, wherein printing, via a 3-dimensional printing process, a layer of edge materials onto the plurality of electrode tabs further includes printing, via an ink-jet printing process, a layer of edge materials onto the plurality of electrode tabs.

16. The method of claim 11, further including:
feeding the strip of metallic foil substrate through a curing station; and
curing the layer of edge materials, after printing, via a 3-dimensional printing process, the layer of edge materials onto the plurality of electrode tabs.

17. The method of claim 11, wherein the metallic foil substrate includes a conductive coating on a top surface and a bottom surface, the first and second edge portions of the metallic foil substrate extending laterally outward beyond the conductive coating;
wherein, feeding the strip of metallic foil substrate through a profile machine and forming a plurality of electrode tabs within the first edge portion of the metallic foil substrate and within the second edge portion of the metallic foil substrate further includes forming notches within the first and second edge portions of the metallic foil substrate that extend inwardly from outermost edges of the first and second edge portions of the metallic foil substrate a distance less than a distance between the outermost edges of the first and second edge portions and the conductive coating.

18. The method of claim 17, wherein printing, via a 3-dimensional printing process, the layer of edge materials onto the plurality of electrode tabs further includes simultaneously printing, via a 3-dimensional printing process, a layer of edge materials on the first and second edge portions between the plurality of electrode tabs.

19. A method of forming edge materials on an electrochemical cell component having a strip of metallic foil substrate including a conductive coating on a top surface and a bottom surface, first and second edge portions of the metallic foil substrate extending laterally outward beyond the conductive coating, comprising:
pulling the strip of metallic foil substrate from a roll;
feeding the strip of metallic foil substrate through a profile machine and forming notches within the first and second edge portions of the metallic foil substrate that extend inwardly from outermost edges of the first and second edge portions of the metallic foil substrate a distance less than a distance between the outermost edges of the first and second edge portions and the conductive coating, and define a plurality of electrode tabs within the first edge portion of the metallic foil substrate and within the second edge portion of the metallic foil substrate;
feeding the strip of metallic foil substrate sequentially through a plurality of 3-dimensional printing machines and printing a plurality of layers of edge materials onto the plurality of electrode tabs and the first and second edge portions between the plurality of electrode tabs; and
rolling the strip of metallic foil substrate onto a roll.

20. The method of claim 2, wherein the feeding the strip of metallic foil substrate through a profile machine further includes removing, with the profile machine, portions of the first and second edge portions of the metallic foil substrate to define the plurality of electrode tabs.

\* \* \* \* \*